Patented June 6, 1944

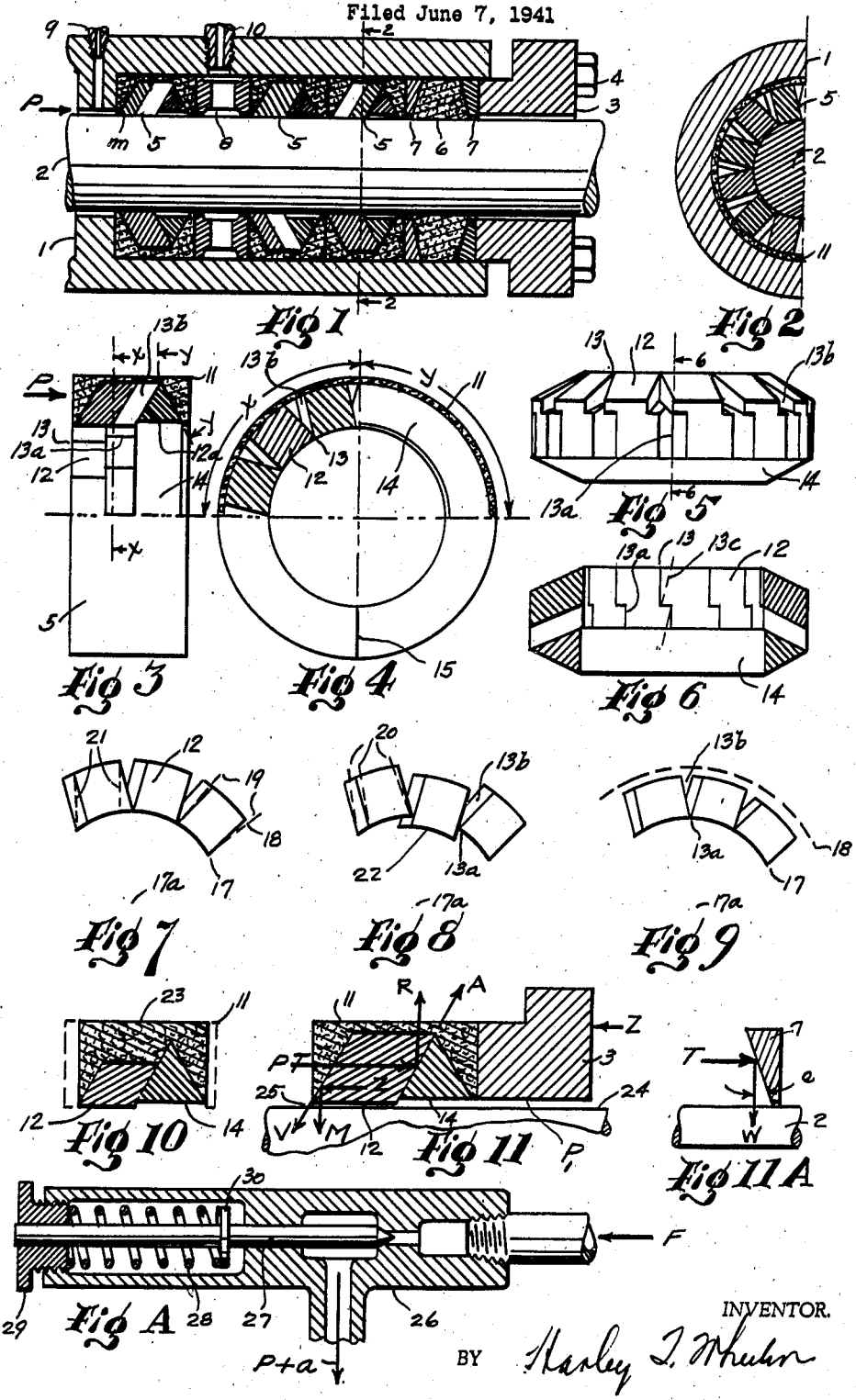

2,350,655

UNITED STATES PATENT OFFICE 2,350,655

ARCH-BOUND POLYSEGMENTAL PACKING RING

Harley T. Wheeler, Dallas, Tex.

Application June 7, 1941, Serial No. 397,049

3 Claims. (Cl. 286—21)

This invention relates to an improved packing ring, and the chief object of its construction is that it may be made to perform as an adjustable orifice, and pressure choke.

Another object is that it is capable of resisting all of the pressure thrust of a fluid, by transmitting said fluid thrust as a fluid frictional contact to the moving surface, with a simultaneous reduction of said pressure.

Still another object is that the internal friction of a fluid may be used to reduce pressure without actual contact of any packing or machine parts.

Yet another object is that by using fluid friction for pressure reduction the friction loss is many times lower than possible with fibrous or other materials in contact with the moving surface.

Another and important object is that the degree of pressure reduction can be varied at will by the operator.

A very important object is that by fluid pressure, a restricted counterflow can be established within the structure, to prevent lodging of sand, or grit within the sealing portions.

An object of great importance to late progress in air compression by rotary blowers, is that fluid injection into the adjustable orifices makes it possible to seal dry gases and corrosives by internal friction of fluids.

These objects together with others, will be described more in detail in the following specification accompanied by the drawing, of which, Figure 1 is a cross-section of a standard stuffing-box, fitted with the arch-bound poly-segmental packing rings of this invention.

Figure 2 is an end view in cross-section of Figure 1.

Figure 3 is a side view in partial cross-section of an arch-bound poly-segmental ring.

Figure 4 is an end view in partial cross-section, along sections x—x and y—y of Figure 3.

Figure 5 is a top plan view of the adjustable segments and arch of Figure 3.

Figure 6 is a plan view of the lower half of Figure 5 along section 6—6 of the latter.

Figure 7 is a diagrammatic end view of the adjustable segments.

Figure 8 shows the extreme flexibility of any one segment.

Figure 9 shows the maintained relations of segments after wear.

Figure 10 shows permanent deformation of the ring cross-section due to wear.

Figure 11 shows the pressure and thrust resolutions with the segmental ring assembly.

Figure 11A shows natural sine relations of end thrusts absorbed by the seal.

Figure A shows a conventional pressure regulating device, with which various functions of the poly-segmental rings may be controlled.

The arch-bound poly-segmental packing ring is not only an improvement, it is an innovation in design, in that it consistently prevents contact of the moving shaft with the packing and utilizes the internal friction of a fluid to reduce the impressed pressure. It should therefore be obvious that important requirements have been met, (1) long life of the packing due to a very slight amount of wear, (2) a very small power loss because fluid friction generated in a thin film is many times less than any contacts of chosen hard materials, and (3) the dependability of action pressure reducing over long periods of time, which is necessary in present practice.

The use of this arch-bound type is at greatest advantage on rotating shafts, altho the design may be adapted to other motions. The feature of forming a thin film of fluid between ordinary packing and a rotating shaft is accomplished occasionally by favorable local conditions, and a satisfactory seal obtained, usually on low pressures. But the consistent capability of establishing a thin fluid film and then of regulating, or choking it to obtain a pressure reduction, is for the first time available by this particular design. The higher the speed the more the internal fluid friction developed, and the higher the pressure the more efficient the pressure reduction will be.

To explain these characteristics more in detail the accompanying drawings are now described.

Figure 1 is the cross section of a conventional stuffing-box 1, housing for this example a rotatable shaft 2, and gland 3 available with adjustable studs 4. Arch-bound poly-segmental rings 5, 5, 5 occupy the annular space between box 1 and shaft 2, seal 6 is held in shape endwise by fittings 7, 7, and regulates the minor seepage coming thru the rings. Lantern 8 is inserted to demonstrate additional pressure level controls which are possible at openings 9 and 10, by the attachment of the regulator of Figure A, which will be discussed elsewhere. Figure 2 is an end view in cross-section along section 2—2 of Figure 1.

The arch-bound packing ring 5 of Figure 3, for an example, is composed of a number of individual arcuate segments 12 circumferentially arranged, the inner faces forming a cylinder of approximately the diameter of the shaft to be sealed. Between each segment is a small aperture 13 which opens into a gap 13b also shown in Figure 4. The series of segments 12 are operated on by pressure P in the direction shown and therefore have conical seats 12a on the downstream side which coincides with the face of arch 14. Arch 14 may be made solid or in true circle halves and has a clearance over the shaft within. The jacket 11 houses the assembly of multiple segments and the arch. As there is but a single row of segments, these are preferably step-cut to form a continuous aperture 13—13a, the interfitting construction forming an impediment to flow of pressure fluid across the segment faces. This interfitting is not necessary, but adds to the efficiency. The gaps 13b are sealed off by the conical seat 12a against arch 14, and any fluid so trapped is further confined by the flexible jacket 11.

Figure 5 is a top plan view of the segments 12 and arch 14, displaying the apertures 13a, the gaps 13b, and the interfitting laps before described. Figure 6 is a plan view of one half of Figure 5, along line 6—6 of the latter, displaying the cylindrical contact face of the segments broken only by the apertures 13—13a. Dotted line 13c indicates that the aperture need not be parallel to the shaft center line.

Figure 7 shows the design relations of the segments 12, circle 17 being approximately the diameter of the shaft to be sealed with shaft center 17a. Periphery 18 is the outer diameter of the segment fitting the inner surface of jacket 11.

The segments 12 of the example are shown to have parallel sides but these may be non-parallel as sides 19, or 20 of Figure 8, and still perform substantially as do parallel sides. The segments may also contact circle 17 at an angle as shown by 21, with or without parallel sides.

The extreme adjustability of individual segments is shown in Figure 8, segment 22 being out of radial alignment yet maintaining the relations of aperture 13a and gap 13b. This indicates any one segment may wear unduly without interfering with sealing performance.

Figure 9 shows that due to substantially uniform wear of all segments the inner contact arcuate circle 17 is maintained as the segments recede from the outer original circle 18, aperture and gap relations remaining the same.

Referring to Figure 10, the original moulded size of the jacket 11, dotted, shrinks as segments 12 wear off on the contacting faces. The reduced shape 23 has the same cross-sectional area as the original 11, the area worn off of the segment 12 being replaced thru gland adjustment by compressing the flexible jacket around segments 12 and arch 14. This change is permanent after wear takes place, yet the relations of arcuate faces, apertures and gaps remain constant, as is described by Figures 7 to 9 inclusive.

The pressure fluid thrust relations of this invention, according to Figure 11, disclose why the arch-bound ring consistently is an adjustable orifice which will maintain a definite setting, or adjustment. Pressure fluid thrust PT acts in a down-stream direction to push segments 12 against arch 14, the latter held stationary by fixed position of the gland 3. All of the segments are simultaneously deflected in direction A, resultant R, away from the contacting surface 24 of the shaft, to increase the annular orifice 25. The practical limit of this movement is the flexibility of the jacket 11, and its porosity as regulated during construction.

To close the orifice 25 mechanical pressure Z is exerted by the operator in an up-stream direction which forces the segment 12 against the jacket 11 to move in direction V, resultant M, toward shaft 24. Thus there is present one automatic pressure thrust endeavoring to open the orifice 25, and the mechanically opposed regulating force effecting a definite position, which as an extreme is contact of segments 12 and shaft 24. It should be obvious that the orifice 25 can be set at a position suitable for reducing the fluid pressure to meet requirements. The pressure reduction is accomplished by permitting a minute volume of fluid to flow across the faces of the segments, the internal fluid friction so developed creating a counter pressure to P and establishing a lower actual pressure P, below the segments. Liquids like oil having high viscosities produce higher internal pressures, causing large pressure differentials P—P across the segments, and make the packing more efficient. The segment wear of this orifice is very slow, caused by the wire-drawing of the fluid passing thru the orifice, the occasional contacting by the shaft during periods of vibration, or due to unnecessary tight adjustment during operation. The choice of the segment material has much to do with erosion and loss of the arcuate surfaces, and how much pressure reduction is obtained by adjustment.

A further means of increasing the pressure differentials across the segments of several rings, as assembled in Figure 1, is the construction of the porous seal ring 6. The endwise pressure thrust which such a seal can transmit to the gland 3 is largely controlled by making the angle of the end fittings 7, 7 according to natural sine angles. For example if .707 of the end thrust is to be diverted toward shaft 2, a 45 degree angle would be chosen. The less the fluid thrust which seal 6 should divert against the shaft, the less the angles of fittings with a perpendicular to the shaft, the extreme limit of no diversion being 0 degrees with a maximum of 90 degrees. For example in Figure 11A, the sealing force W diverted from downstream thrust T will vary, according to the natural sine of angle e.

A valuable result of establishing counterflow may be obtained with these adjustable orifice segmental rings in a stuffing-box, as demonstrated by use of the lantern 8 in Figure 1, and attachment of the pressure regulator of Figure A at point 10. Said regulator is a conventional type having a body 26 thru which passes stem 27, automatically adjusted by spring 28 nesting against adjustable nut 29 and pushing against collar 30 in turn forcing stem 27 against a seat, to throttle pressure F to a lower value P plus a.

Counterflowing means introduces thru the passage at point 10, a fluid pressure which is greater than impressed pressure P of Figure 1, for example by value a. Thus the higher pressure F when throttled down to P plus a and injected thru passage 10 causes an upstream flow counter to impressed pressure P, by passing thru the orifice m, and by being prevented from passing downstream by the segments below the lantern 8 and adjustment of seal ring 6. The total pressure to be resisted by the packing would be P plus a, instead of P.

Water under pressure carrying sand, syrups saturated with carbon dust, and similar conditions, can by this method now be sealed by pure liquids under pressure P plus a, injected at point 10. The pure fluid at higher pressure seals the packing without undue wear and seeps thru orifice *m* to fend off gritty particles and preventing them from entering any part of the seals by maintaining a constant film of liquid at the point of entry.

Another result of importance is the sealing of dry gases, also corrosive gases, around rotating shafts, by proper assembly of my adjustable orifice rings. The regulator of Figure A is attached at point 9, or 10, of Figure 1.

A fluid such as water or oil is introduced thru the passage at point 9 at a pressure level of P plus *a*, slightly higher than impressed gas pressure P, to maintain a cloud of moisture before orifice *m*. All of the orifices are preferably adjusted so as not to contact the shaft 2, seal 6 is arranged for high porosity with but slight deflection of end thrust against shaft 2, and a mixture of gas and fluid allowed to slowly seep thru the packing assembly. It is thus possible to seal dry gases, with vapours of various fluids, without any contact of packing parts with high speed shafts, a very valuable improvement for the late type rotary gas compressors.

The peculiarities of design are reflected in the construction of the rings. To form the jacket the first steps of the preferred method are shown in Figures 12 to 15, a quadrilateral of flexible material 31 is folded along line 32 to form folds 33, as shown by end view Figure 13. Then the folded sections 33 are bent at an angle as shown by Figures 14 and 15.

The degree of wear, the capability to withstand extreme heat or chemicals depends to a great extent on the choice of materials thru-out. Other factors such as the choice of angles of segment faces, the length of segments, the angle of the thrust taking seal, the amount of the interfitting of the segment faces and numerous other variations possible in the art of making and using this type of ring, are included in my idea, and I observe that the variation of such, to affect efficiencies, performance or applications, do not detract from my invention.

I claim:

1. A poly-segmental packing assembly including a plurality of segments, stepped edge surfaces on adjacent segments to align the segments circumferentially, substantially parallel inclined faces at the ends of the segments, an arch ring against which the segments abut, each segment having an open channel abutting said ring to provide a channel for sealing fluid, and a jacket of deformable material enclosing said segments and ring so that fluid pressure applied to said jacket tends to confine the segments and feed them against said ring and the member being packed to provide a seal.

2. A poly-segmental packing assembly including a plurality of segments, stepped edged surfaces on adjacent segments to align the segments circumferentially, substantially parallel inclined faces at the ends of the segments, an arch ring against which the segments abut, each segment having an open channel abutting said ring to provide a channel for sealing fluid, a jacket of deformable material enclosing said segments and ring so that fluid pressure applied to said jacket tends to confine the segments and feed them against said ring and the member being packed to provide a seal, and means to apply a fluid pressure to the jacket.

3. In a rod or the like packing an assembly comprising a deformable jacket member of porous material, a plurality of circumferentially arranged segments and an arch support ring disposed in relatively movable position in said jacket whereby pressure applied in said jacket tends to feed said segments against the member being sealed, and means to allow a film of liquid to flow between said segments and the member being sealed.

HARLEY T. WHEELER.